United States Patent
Peyton et al.

(10) Patent No.: US 11,746,241 B2
(45) Date of Patent: *Sep. 5, 2023

(54) ANTIFUNGAL/ANTIBACTERIAL HYDROPHILIC COATING

(71) Applicant: Hamilton Sundstrand Corporation, Charlotte, NC (US)

(72) Inventors: Barbara M. Peyton, Windsor, CT (US); Carol L. Metselaar, Vernon, CT (US); John W. Steele, New Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 367 days.

This patent is subject to a terminal disclaimer.

(21) Appl. No.: 16/742,666

(22) Filed: Jan. 14, 2020

(65) Prior Publication Data

US 2021/0214562 A1 Jul. 15, 2021

(51) Int. Cl.
| | |
|---|---|
| *C09D 1/00* | (2006.01) |
| *F28F 13/18* | (2006.01) |
| *C09D 7/40* | (2018.01) |
| *C09D 7/61* | (2018.01) |

(52) U.S. Cl.
CPC ................ *C09D 1/00* (2013.01); *C09D 7/61* (2018.01); *C09D 7/69* (2018.01); *F28F 13/182* (2013.01); *F28F 2245/02* (2013.01); *F28F 2265/20* (2013.01)

(58) Field of Classification Search
CPC .. F28F 2245/02; F28F 2265/20; F28F 13/182; C09D 1/00; C09D 7/61; C09D 7/69; C09D 5/14; F28D 1/053; F28D 2021/0021
USPC ........................................................ 428/323
See application file for complete search history.

(56) References Cited

U.S. PATENT DOCUMENTS

| | | | |
|---|---|---|---|
| 5,264,250 A * | 11/1993 | Steele .................. | C09D 5/14 106/15.05 |
| 5,305,827 A | 4/1994 | Steele et al. | |
| 5,503,840 A | 4/1996 | Jacobson | |
| 5,562,949 A | 10/1996 | Steele et al. | |
| 6,170,564 B1 * | 1/2001 | Steele .................. | C09D 5/14 424/407 |
| 6,630,106 B1 | 10/2003 | Levy | |
| 7,008,979 B2 | 3/2006 | Schottman et al. | |
| 2004/0101572 A1 | 5/2004 | Kepner et al. | |
| 2007/0000407 A1 | 1/2007 | Leong | |
| 2010/0062032 A1 | 3/2010 | Sharma | |
| 2015/0048272 A1 | 2/2015 | Rai et al. | |
| 2015/0168085 A1 | 6/2015 | Wagner | |
| 2018/0244930 A1 * | 8/2018 | Steele .................. | F28F 19/04 |
| 2018/0340081 A1 | 11/2018 | Steele | |
| 2019/0364886 A1 | 12/2019 | Steele et al. | |
| 2022/0009806 A1 * | 1/2022 | Peyton ................. | C09D 5/14 |

FOREIGN PATENT DOCUMENTS

| | | |
|---|---|---|
| CN | 108485441 A | 9/2018 |
| JP | 2001280879 A | 10/2001 |
| WO | 2019246025 A1 | 12/2019 |

OTHER PUBLICATIONS

Titanium oxide literature, 33 pages downloaded on Sep. 1, 2021 from https://pubchem.ncbi.nlm.nih.gov/compound/Titanium-oxide (Year: 2021).*
Extended European Search Report for EP Application No. 21184337.0 dated Nov. 5, 2021, pp. 1-7.
Krishna et al., "Contaminant-Activated Visible Light Photocatalysis", Scientific Reports, published online Jan. 30, 2018, 11 pages.
U.S. Final Office Action for U.S. Appl. No. 16/922,418, dated Mar. 24, 2022, 16 pages.
U.S. Non-Final Office Action issued in U.S. Appl. No. 16/922,418 on Dec. 1, 2021, 17 pages.

* cited by examiner

*Primary Examiner* — Callie E Shosho
*Assistant Examiner* — Steven A Rice
(74) *Attorney, Agent, or Firm* — CANTOR COLBURN LLP

(57) ABSTRACT

Disclosed herein is a hydrophilic coating that includes an adhesive agent; an insolubilizer for insolubilizing the adhesive agent; titanium dioxide; and a metal oxide selected from the group consisting of silver oxide, copper oxide, iron oxide, magnesium oxide, and combinations thereof. The hydrophilic coating is useful on the heat transfer surfaces of a condensing heat exchanger.

9 Claims, 2 Drawing Sheets

ANTIFUNGAL/ANTIBACTERIAL HYDROPHILIC COATING

BACKGROUND

Exemplary embodiments of the present disclosure pertain to the art of hydrophilic coatings.

It is desirable in most environments to conserve resources. Such conservation may be more desirable in environments in which the resources are limited. For example, water on a spacecraft may be in relatively limited supply. In that regard, it may be desirable to conserve water aboard such spacecraft.

Spacecraft may include heat exchangers that transfer heat away from the ambient air. Due to the relatively cool temperature of components of the heat exchangers, moisture may condense on such components. In that regard, a hydrophilic coating may be applied to the heat exchanger to facilitate collection of the condensed moisture such that the moisture may be reused as drinking or other water.

BRIEF DESCRIPTION

Disclosed herein is a hydrophilic coating. The hydrophilic coating includes an adhesive agent; an insolubilizer for insolubilizing the adhesive agent; titanium dioxide; and a metal oxide selected from the group consisting of silver oxide, copper oxide, iron oxide, magnesium oxide, and combinations thereof.

In addition to one or more of the features described above, or as an alternative to any of the foregoing embodiments, the metal oxide is selected from the group consisting of silver oxide, copper oxide and combinations thereof.

In addition to one or more of the features described above, or as an alternative to any of the foregoing embodiments, the metal oxide is silver oxide.

In addition to one or more of the features described above, or as an alternative to any of the foregoing embodiments, the adhesive agent includes potassium silicate and the insolubilizer includes zinc oxide.

In addition to one or more of the features described above, or as an alternative to any of the foregoing embodiments, the titanium oxide is present in an amount of 10 to 25 percent by weight, based on the total weight of the hydrophilic coating.

Also disclosed is a condensing heat exchanger having heat transfer surfaces coated with hydrophilic coating. The hydrophilic coating includes an adhesive agent; an insolubilizer for insolubilizing the adhesive agent; titanium dioxide; and a metal oxide selected from the group consisting of silver oxide, copper oxide, iron oxide, magnesium oxide, and combinations thereof.

In addition to one or more of the features described above, or as an alternative to any of the foregoing embodiments, the metal oxide is selected from the group consisting of silver oxide, copper oxide and combinations thereof.

In addition to one or more of the features described above, or as an alternative to any of the foregoing embodiments, the metal oxide is silver oxide.

In addition to one or more of the features described above, or as an alternative to any of the foregoing embodiments, the adhesive agent includes potassium silicate and the insolubilizer includes zinc oxide.

In addition to one or more of the features described above, or as an alternative to any of the foregoing embodiments, the titanium oxide is present in an amount of 10 to 25 percent by weight, based on the total weight of the hydrophilic coating.

Also disclosed is a method for coating heat transfer surfaces of a condensing heat exchanger with the coating described hereinabove. The method includes flowing or spraying the coating in the form of a slurry and allowing the slurry to intimately contact and coat the heat transfer surfaces; and heating the coated heat transfer surfaces to dry and cure the slurry. The coating slurry includes an adhesive agent; an insolubilizer for insolubilizing the adhesive agent; titanium dioxide; and a metal oxide selected from the group consisting of silver oxide, copper oxide, iron oxide, magnesium oxide, and combinations thereof.

In addition to one or more of the features described above, or as an alternative to any of the foregoing embodiments, the metal oxide is selected from the group consisting of silver oxide, copper oxide and combinations thereof.

In addition to one or more of the features described above, or as an alternative to any of the foregoing embodiments, the metal oxide is silver oxide.

In addition to one or more of the features described above, or as an alternative to any of the foregoing embodiments, the adhesive agent includes potassium silicate and the insolubilizer includes zinc oxide.

In addition to one or more of the features described above, or as an alternative to any of the foregoing embodiments, the titanium dioxide is present in an amount of 10 to 15% by weight, based on the total weight of the slurry.

In addition to one or more of the features described above, or as an alternative to any of the foregoing embodiments, the adhesive agent is present in an amount of 10 to 30% by weight, based on the total weight of the slurry.

In addition to one or more of the features described above, or as an alternative to any of the foregoing embodiments, the insolubilizer is present in an amount of 2 to 8% by weight, based on the total weight of the slurry.

In addition to one or more of the features described above, or as an alternative to any of the foregoing embodiments, the metal oxide is present in an amount of 2 to 10% by weight, based on the total weight of the slurry.

In addition to one or more of the features described above, or as an alternative to any of the foregoing embodiments, the titanium dioxide, insolubilizer and metal oxide have an average particle size of 6 to 14 microns.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
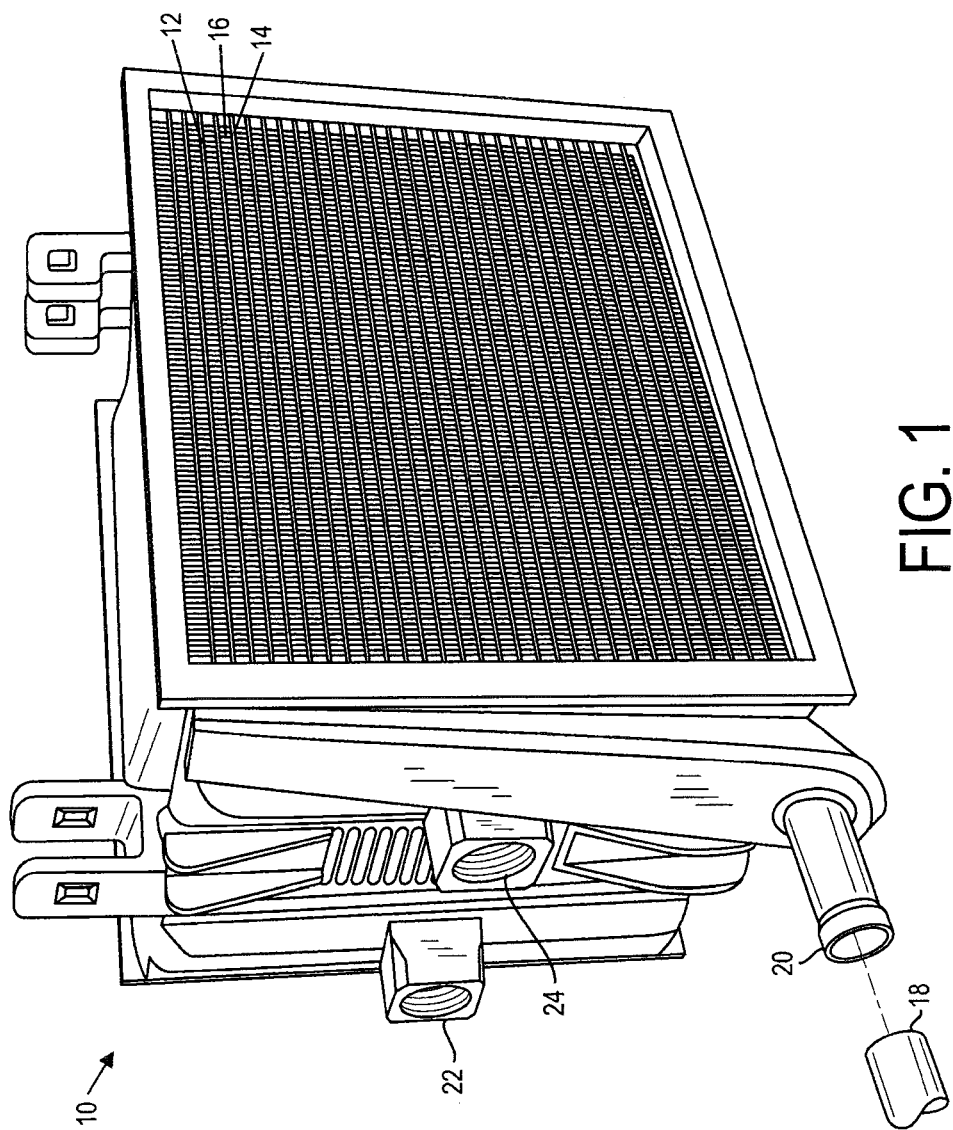
FIG. 1 is a schematic view of an exemplary heat exchanger.

FIG. 1 illustrates selected portions of an example heat exchanger 10. In this example, the heat exchanger 10 includes slurper bars 12 in alternating configuration with cooling tubes 14. Fins 16 separate the slurper bars 12 and cooling tubes 14. The slurper bars 12 collect moisture from passing air and wick the moisture away from an air flow stream through the heat exchanger 10 to prevent condensation and formation of water droplets. The slurper bars 12 are in fluid communication with a vacuum source 18 that is connected to the heat exchanger 10 through a vacuum port 20 in a known manner. Coolant for cooling heat-producing units within a spacecraft (such as a space station or space vehicle), for example, flows through the heat exchanger 10 through respective inlet and outlet ports 22 and 24.

Figure 2:
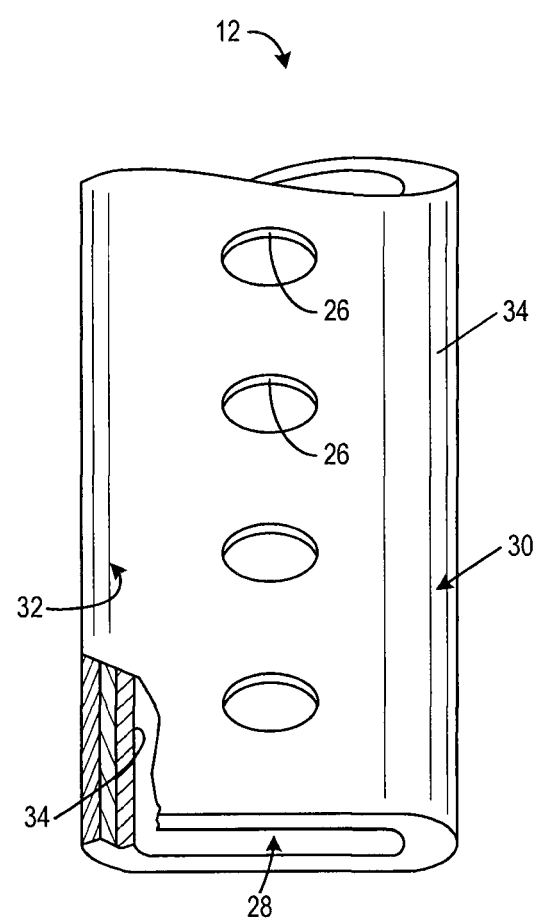
FIG. 2 is a schematic view of an exemplary slurper bar of the heat exchanger of FIG. 1.

Referring to FIG. 2, the slurper bars 12 each include openings 26 that fluidly connect a passage 28 to the passing air flow stream. The vacuum source 18 (FIG. 1) evacuates the passage 28. An outside surface 30 and an inner surface 32 of the passage are coated with a hydrophilic coating 34 that promotes moisture condensation and wicking. The hydrophilic coating 34 is prepared in a slurry. The body of the heat exchanger 10 (i.e., the interior fin-stock) is coated with a fill-and-drain operation using the slurry, and the inner and outer surfaces of the slurper bars 12 are spray coated prior to welding to the heat exchanger 10. After the coatings, the hydrophilic coating 34 is cured (i.e., it is heated for a period of time).

Although the hydrophilic coating will be described herein in reference to coating heat transfer surfaces in a condenser, it is not limited thereto. This coating can be utilized on any surface in which wetting and wicking, and optionally, the inhibition of microbial proliferation, are desired.

The hydrophilic coating 34 includes an adhesive agent; an insolubilizer for insolubilizing the adhesive agent; titanium dioxide; and a metal oxide selected from the group consisting of silver oxide, copper oxide, iron oxide, magnesium oxide, and combinations thereof. In some embodiments the metal oxide includes silver oxide, copper oxide or a combination thereof. In some embodiments the metal oxide is silver oxide.

The titanium dioxide increases the surface energy of the heat transfer surfaces in a condenser and thereby provides the hydrophilic characteristics of the coating. In particular, the titanium dioxide provides a very high surface energy or polarity to the coating, inducing an "attraction" for anions such as hydroxyl ions. As a result, this polar surface causes a low interfacial energy between the condensate and the heat transfer surfaces, thereby effecting the desired wetting. After the surface is wetted, the water thereon wicks into the inherently porous coating through capillary action. The water drawn into the pores of the coating draws other water molecules into the coating through inter-molecular attraction.

Using titanium dioxide results in several advantages. Titanium dioxide hydrophilic coatings have better adhesion than prior art silicon dioxide coatings. This is shown by the fact that static dissolution tests show no detectable titanium dioxide in the condensate. This greatly reduces the possibility for downstream clogging and increases the life span of the coating. Titanium dioxide based hydrophilic coatings also show increased resistance to hydrophobic contaminants, particularly octanoic acid and diethyl phthalate. Silicon dioxide based coatings can become hydrophobic after exposure to these contaminants. Titanium dioxide based hydrophilic coatings show improved adhesion properties by an order of magnitude compared to silicon dioxide based hydrophilic coatings. When tested by according to ASTM D3359-17 the silicon dioxide based coating shows a mass loss of 1%-2%. The titanium oxide based coating shows a mass loss of 0.1%. Improved adhesion prolongs the life of the coating and protects downstream components.

The titanium dioxide is present in an amount of 8 to 20 by weight, based upon the total weight of the coating in the form of a coating slurry. A coating slurry is defined as including an adhesive agent; an insolubilizer for insolubilizing the adhesive agent; titanium dioxide; silver oxide and water or a water-based solvent. In some embodiments the concentration of titanium dioxide is 10% to 15% by weight or, 11% to 13% by weight, based upon the total weight of the slurry. The titanium dioxide content in the cured coating may be 10 to 20% by weight.

The titanium dioxide may have an average particle size of 6 to about 14 microns, or, 8 to 10 microns. Particle sizes within these ranges increase slurry life, decrease separation of the components of the slurry, and simplify mixing of the slurry.

The adhesive agent may be potassium silicate, lead borosilicate, or a combination thereof. One such adhesive agent is Kasil® #1, produced by Philadelphia Quartz Co., Philadelphia, Pa. Kasil® #1 contains 20.8% by weight silica, 8.3% by weight potassium oxide, balance water. The adhesive agent may be present in an amount of 10% to 30% by weight or, 15% to about 25% by weight, based upon the total weight of the slurry.

During preparation of the coating, the adhesive agent is generally in the form of a water soluble material. As a result, coating preparation requires conversion of the adhesive agent from a water soluble material to a water insoluble material with an insolubilizer which does not adversely affect the coating. The insolubilizer may have an average particle size of 6 to 14 microns, or, 8 to 10 microns.

Exemplary insolubilizers include silicofluorides ($SiF_6$) of sodium, potassium, barium, manganese, and mixtures thereof, and inorganic oxides such as zinc oxide, among others. One such inorganic oxide is Kadox® 15, 99% pure zinc oxide, produced by New Jersey Zinc Co., Ogdensborg, N.J. Particularly with the silicofluoride insolubilizers, sodium hydroxide can be used as a colloidal dispersant. The insolubilizer is present in an amount of 2 to about 8% by weight or, 3 to about 6% by weight, based upon the total weight of the slurry.

During preparation of the hydrophilic coating, the titanium dioxide is combined with the adhesive agent and the insolubilizer in a solvent that does not adversely affect the final coating, to form a slurry. This solvent is typically water or a water-based solvent. The solvent is present in an amount of 50% to 70% by weight, or 55% to 65% by weight, based upon the total weight of the slurry.

The hydrophilic coating further includes a metal oxide selected from the group consisting of silver oxide, copper oxide, iron oxide, magnesium oxide, and combinations thereof. The metal oxide provides biocidal characteristics to the coating. In order to prevent microbial proliferation, especially during longer term space missions, the metal oxide slowly dissolves into the condensate and inhibits microbial growth. It is thought that the metal oxide inhibits microbial growth by attacking the cellular DNA of microorganisms.

The metal oxide is present in an amount of 2.0 to 10.0, or 2.0 to 5.0, or 2.0 to 3.0% by weight, based upon the total weight of the slurry. This amount of metal oxide is greater than previously thought possible. The combination of the titanium dioxide and the metal oxide allows for a greater content of metal oxide than was previously possible without a loss of adhesion. The higher level of metal oxide results in antifungal properties as well. This is in marked contrast to coatings that use silica dioxide instead of titanium dioxide. In inhibition zone fungal testing the silica dioxide based coating has a small, poorly defined zone of inhibition whereas the titanium dioxide based coating had a large and well defined zone. The method of testing was ASTM G22.

As with the titanium dioxide and the insolubilizer, the metal oxide may have an average particle size of 6 to 14 microns, or, 8 to 10 microns. As stated above, particle sizes in this range increase the slurry life, components do not separate out as quickly, and the slurry is easier to mix.

In preparing the present inventive coating, the slurry components are mixed until essentially homogenous and then preferably utilized before the components aggregate or agglomerate and settle creating component rich and component devoid areas in the coating.

Application of the coating, in the form of a slurry, to heat transfer surfaces can be accomplished in various manners, all of which are conventional. These conventional processes included dipping, spraying, and painting the heat transfer surfaces with the slurry, flowing the slurry through the condenser and allowing it to remain a sufficient period of time to coat the heat transfer surfaces, and other common coating techniques.

Once the coating has been applied it must be dried and cured. Ultimately, complete removal of the water or water-based solvent and complete curing of the coating is desired. Various manners of accomplishing water or water-based solvent removal and curing include the use of a vacuum, flowing dry air over the coating, and heating the coating to a temperature which will induce curing without sintering, or conventional water or water-based solvent removal and curing techniques. Since water evaporates at 100° C., if the temperature of the coating is rapidly raised to above about 110° C., the water will rapidly vaporize thereby causing cracks and flaking in the coating. As a result, it is preferred to slowly raise the temperature of the coating sequentially or very slowly over a period of about 1 to about 6 hours.

One possible curing sequence includes heating the coating to 175 to 185° C. for 20 to 40 minutes, raising the temperature to 190 to 210° C. for 60 minutes, then increasing the temperature to 215 to 225° C. for 30 minutes, then increasing the temperature to 245 to 255° C., then increasing the temperature to 290 to 310° C. for 60 minutes, and finally maintaining the temperature at about 490 to 510° C. for 2 hours.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for coating heat transfer surfaces of a condensing heat exchanger comprising applying a coating slurry comprising an adhesive agent; an insolubilizer for insolubilizing the adhesive agent; titanium dioxide; and a metal oxide selected from the group consisting of silver oxide, copper oxide, iron oxide, magnesium oxide, and combinations thereof to form a coating; and curing the coating;
   wherein curing the coating comprises heating the coating to 175 to 185° C. for 20 to 40 minutes, raising the temperature to 190 to 210° C. for 60 minutes, then increasing the temperature to 215 to 225° C. for 30 minutes, then increasing the temperature to 245 to 255° C., then increasing the temperature to 290 to 310° C. for 60 minutes, and finally maintaining the temperature at about 490 to 510° C. for 2 hours.

2. The method of claim 1, wherein the metal oxide is selected from the group consisting of silver oxide, copper oxide and combinations thereof.

3. The method of claim 1, wherein the metal oxide is silver oxide.

4. The method of claim 1, wherein the adhesive agent comprises potassium silicate and the insolubilizer comprises zinc oxide.

5. The method of claim 1, wherein the titanium dioxide is present in an amount of 10 to 15% by weight, based on the total weight of the coating slurry.

6. The method of claim 1, wherein the adhesive agent is present in an amount of 10 to 30% by weight, based on the total weight of the coating slurry.

7. The method of claim 1, wherein the insolubilizer is present in an amount of 2 to 8% by weight, based on the total weight of the coating slurry.

8. The method of claim 1, wherein the metal oxide is present in an amount of 2 to 10% by weight, based on the total weight of the coating slurry.

9. The method of claim 1, wherein the titanium dioxide, insolubilizer and metal oxide have an average particle size of 6 to 14 microns.

* * * * *